Nov. 5, 1957
I. FRIEDMAN
2,811,853
TORQUE METER
Filed July 5, 1955
2 Sheets-Sheet 1
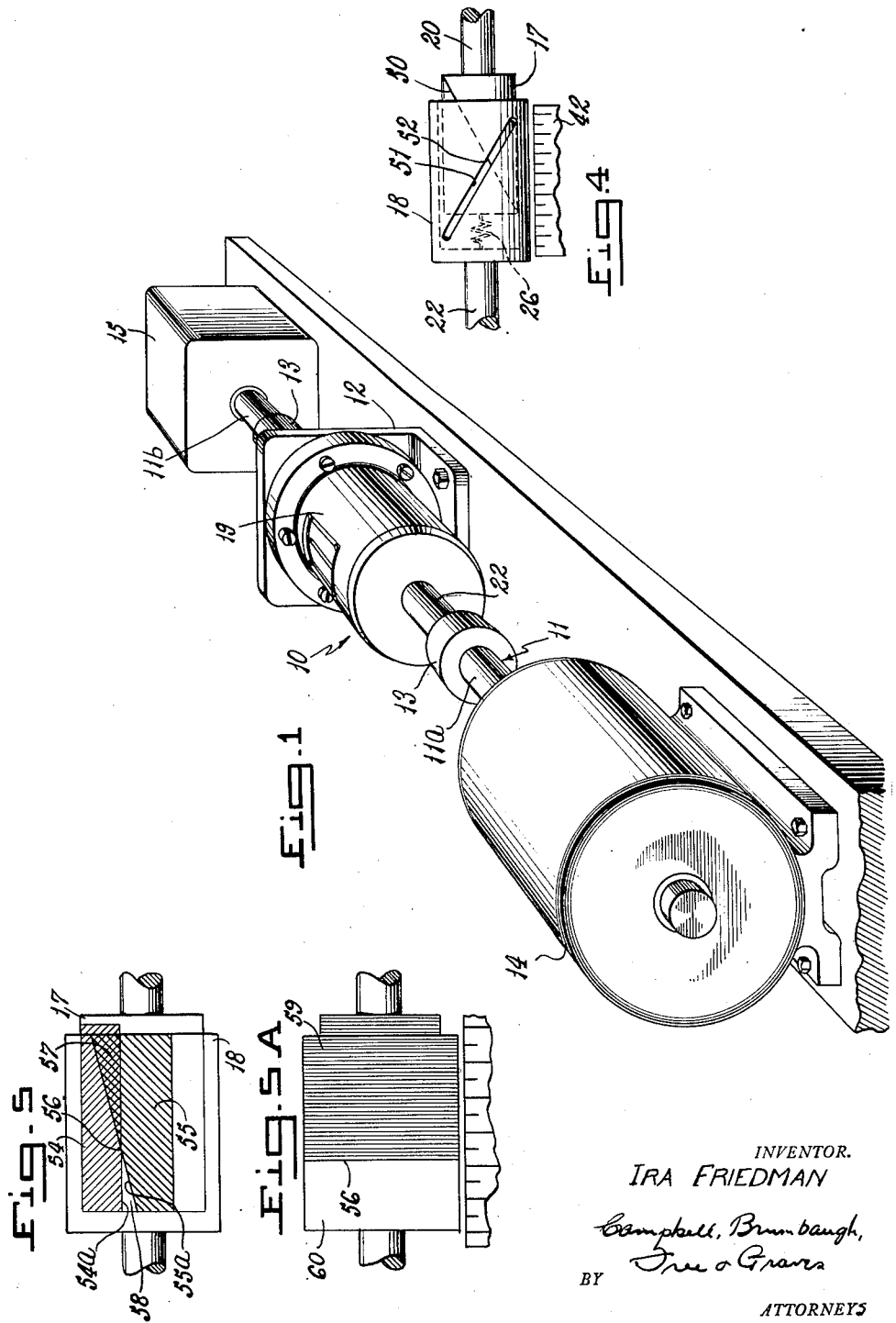
INVENTOR.
IRA FRIEDMAN
BY Campbell, Brumbaugh,
Free & Graves
ATTORNEYS Nov. 5, 1957
I. FRIEDMAN
2,811,853
TORQUE METER
Filed July 5, 1955
2 Sheets-Sheet 2
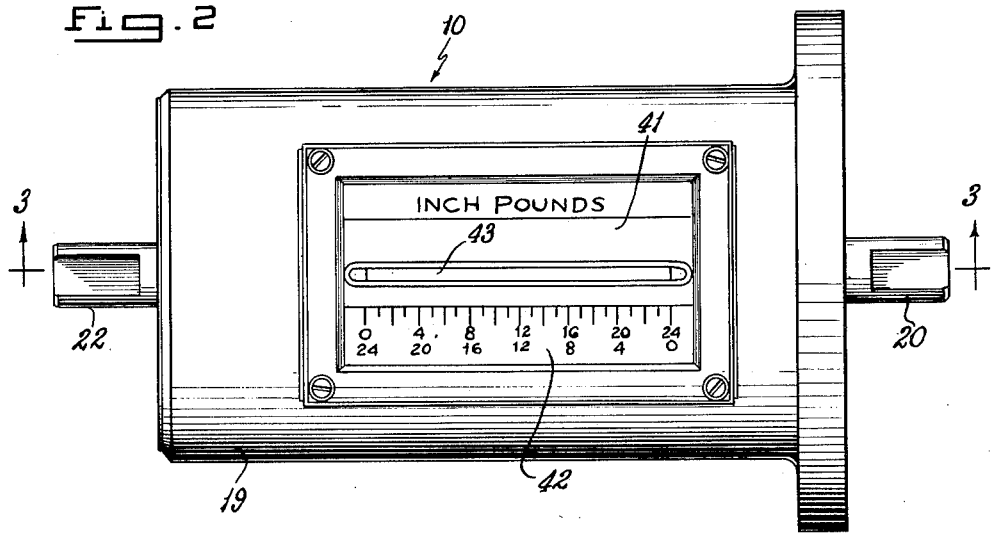
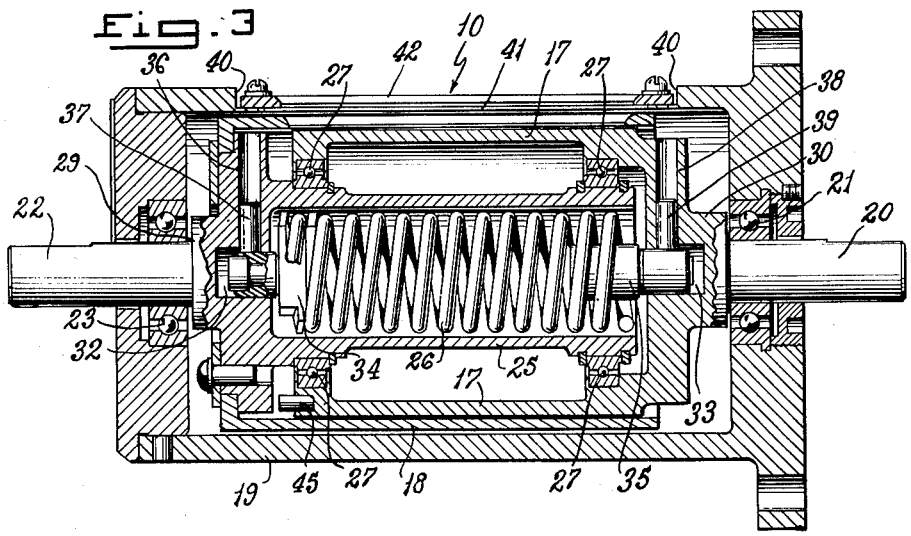
INVENTOR.
IRA FRIEDMAN
BY
ATTORNEYS

2,811,853
TORQUE METER

Ira Friedman, New Hyde Park, N. Y., assignor to Fairchild Engine and Airplane Corporation, Hagerstown, Md., a corporation of Maryland Application July 5, 1955, Serial No. 519,708

3 Claims. (Cl. 73—136)

This invention relates to dynamometers or torque measuring devices generally, and more particularly, to a device of that general organization comprising resiliently coupled members between the drive end and the load end of a torque transmitting shaft and superimposed means carried by the members for generating an index line discernible while the shaft is rotating by the image persistance of the eye, the position of said index line being movable with respect to a scale as the relative rotational displacement between the drive end and the load end of the shaft changes.

In one embodiment of the invention, the dynamometer unit comprises two concentric rotatable drums in telescoping relationship, one of which is secured to the drive end of the torque transmitting shaft and the other of which is secured to the load end of the shaft, and a spring coupling between the drums. The spring tends to maintain the drums in a predetermined relative position when no torque is transmitted by the shaft and to resist relative angular displacement therebetween while the shaft is transmitting torque. The inner drum carries an extended reference having a longitudinal component, such as a line or an edge of a pattern, and the outer drum carries an extended reference having a longitudinal component, such as an opaque pattern superimposed on a transparent background, a transparent pattern on an opaque background, or a narrow slit, angularly disposed in relation to the reference on the inner drum, such that the two references intersect. When the shaft is transmitting torque, the resilient coupling between the drums will yield, causing the driven drum to lag behind the driving drum. The angle of this rotational displacement between the two drums is a function of the torque. This displacement, in turn, changes the position at which the angularly disposed references on the inner and outer drums intersect, and when the two drums are revolving, this point or area of intersection of the respective superimposed markings of the drums generates, by the image persistance or retentivity of the eye, a distinguishable index line, the position of which may be observed in relation to a calibrated scale to indicate a measure of the torque transmitted by the shaft.

The device of the present invention, while simple in design and construction, is nevertheless a rugged, dependable, inexpensive and accurate instrument which requires no external power source, so that the unit is especially ideal for use where auxiliary power sources do not exist, for example, in field testing.

For a complete understanding of the present invention, reference may be had to the detailed description which follows and to the accompanying drawings in which:

Fig. 1 is a perspective view of the dynamometer of the present invention installed between a driving source and a load;

Fig. 2 is an enlarged view of the unit shown in Fig. 1;

Fig. 3 is a view taken substantially on the line 3—3 of Fig. 2, looking in the direction of the arrows;

Fig. 4 is a view of the inner and outer drums to illustrate the manner in which the index line is generated;

Fig. 5 is a view similar to Fig. 4 showing alternative means for generating an index line; and Fig. 5A is an illustrative view of the index line generated by the embodiment shown in Fig. 5.

Referring to the drawings, the dynamometer unit, generally designated 10, of the present invention may be inserted between the drive end 11a and the load end 11b of a torque transmitting shaft 11 by means of flexible couplings 13 which serve to eliminate shaft loading caused by misalignment. The drive end 11a of the shaft may be connected to a suitable drive 14, and the load end 11b of the shaft may be connected to any suitable load 15.

As best shown in Figs. 2 and 3, the dynamometer unit comprises inner and outer coaxial drums or cylinders 17 and 18, respectively, which drums are rotatably accommodated within a housing 19. The housing 19 may be mounted at one end to a suitable support 12. The inner drum 17 is connected to a shaft 20 rotatably mounted in a bearing 21 at one end of the housing 19, and the outer cylinder 18 is connected to a shaft 22 rotatably mounted in a bearing 23 at the opposite end of the housing 19. The shaft 20 is connected by means of a flexible coupling 13 to the load end 11b of the shaft 11, and the shaft 22 is connected by means of a similar flexible coupling 13 to the drive end 11a of the shaft 11.

The center of the outer drum 18 is provided with a hollow cylindrical housing 25 which accommodates a spring 26 therein. The outer periphery of the hollow cylindrical housing 25, in turn, serves as a support for the inner drum 17 which is rotatably mounted thereon on bearings 27.

The shaft 22 of the outer drum 18 is connected to a hub portion 29 formed at one end of the drum 18, and the shaft 20 is connected to a hub portion 30 formed at one end of the inner drum 17. The drums 17 and 18 are, in other words, a cup-shaped formation, the open ends being in telescoping relationship.

The hub portions 29 and 30 are provided with axial bores 32, 33, respectively, which bores accommodate therein the shanks of spring retaining members 34, 35, respectively. The spring 26 is connected at one end to the spring retaining member 34 and at the other end to the spring retaining member 35. To prevent rotation of the spring retaining member 34 within its bore 32, the hub portion 29 of the outer drum 18 is provided with one or more threaded radial holes 36, each accommodating a locking screw 37 therein which locks the spring retaining member 34 within the bore and against rotation. Similarly, the hub portion 30 of the inner drum 17 is provided with one or more threaded radial holes 38, each accommodating a locking screw 39 therein to lock the spring retaining member 35 within the bore and to prevent its rotation within the bore.

The housing 19 is provided with an aperture 40 therein (see Fig. 3), which aperture accommodates a plate 41 having a slot 43 therein and a scale 42 imprinted on its exposed face beneath the slot. The plate 41 is covered by a glass window 42 set into the aperture 40. As shown in Fig. 2, the plate 41 contains two scales reading from opposite directions, and the scale in use will depend on the direction of rotation of the shaft 11.

It will be apparent that when no torque is being transmitted via the shaft 11, the spring 26 which resiliently couples the inner and outer drums 17 and 18, respectively, will normally maintain the drums in a predetermined relative "zero" position. The "zero" position may be determined by the unstressed condition of the spring, in which event the dynamometer will be capable of transmitting torque in either direction of rotation. Alternatively, the "zero" position may be determined by the engagement of a stop pin 45 carried by the inner drum 17 with a companion stop surface carried by the hub portion 29 of the outer drum 18 in which event the dynamometer will operate in only one direction.

When torque is transmitted to the load 15 via the shaft 11, the resilient spring coupling 26 will yield as the torque increases, causing the driven drum 17 to lag behind the driving drum 18. This angle of lag, referred to herein as the angle of rotational displacement between the drums, is, therefore, a measure of the torque transmitted by the shaft.

The means for enabling the relative rotational displacement of the two drums to be read while being continuously rotated is accomplished by providing superimposed intersecting markings or indicia on the inner and outer drums 17 and 18, respectively, and exposing to view at least a portion of the marking or indicia of the inner surface in such manner that when the drums 17 and 18 are rotating, the intersecting indicia will show up as and index which can be read relative to the calibrated scale 42.

There are, of course, various suitable indicia which may be employed to generate an index line when the cylinders are rotating. One such means is shown in Fig. 4 wherein a line 50 is inscribed on the outer surface of the inner drum 17 and a portion of said line is visible through a slot 51 formed in the outer cylinder 18 and superimposed above the line 50 in such fashion that it intersects the line 50, exposing only a small portion 52 thereof to view. Due to the persistance or retentivity of an image to the eye when the drums 17, 18 are rotating, the rapidly moving segment 52 of the line 50 visible through the slot 51 will appear as a line or strip. Furthermore, because the point of intersection of the slot 51 with the line 50 will change with the angle of displacement or lag between the drums, the index line will be displaced relative to the scale 42, providing a measurement of the torque transmitting via the shaft. The line 50 may be a continuous line or it may be formed by a series of discrete marks, such as a series of dots or vertical stripes.

Still another scheme for generating a readable index line discernible by virtue of the persistance of an image to the eye is shown in Figs. 5 and 5A. In this scheme, a pattern 54 defined by an edge 54a is formed on the lighter background of the inner drum 17 and an opaque pattern 55 defined by an edge 55a is formed on the outer transparent drum 18. The intersection of the lines 54a and 55a is denoted by the reference symbol 56. There is an area to the right of the point 56 where the patterns 54, 55 overlap, which area is generally designated 57 in Fig. 5, and there is an area to the left of the point 56, designated 58, defined by the edges 54a and 55a between which the lighter background of the inner drum is visible. When, therefore, the drums 17 and 18 are rotating, the point 56 will be discernible as a line (see Fig. 5A) which separates the darker and lighter backgrounds 59, 60, respectively.

It is, of course, evident that other equally suitable schemes may be employed for producing a discernible index which is displaceable with respect to the scale 42 in accordance with the rotational displacement between the cylinders 17 and 18. It is also evident that the intersecting lines or paths may be curved to increase the accuracy of measurement at one end of the scale, say, the higher end of the scale.

The invention has been shown by way of example only, and obviously many variations and modifications may be made therein without departing from the spirit of the invention. For example, instead of employing overlapping or telescoping cylinders 17 and 18, as in the present arrangement, resiliently coupled plates or discs may be provided as a measure of the torque between the drive end and load end of a shaft. It is to be understood, therefore, that the invention is not to be limited to any specified form or embodiment, except insofar as such limitations are set forth in the appended claims.

I claim:

1. A torque measuring device adapted for connection between the drive end and the load end of a shaft comprising a drum connected to the drive end of the shaft, a drum connected to the load end of the shaft, said drums being arranged in telescoping relationship, a stop carried by one drum, companion means engageable with said stop carried by the other drum, a spring forming a resilient coupling between the drive end and the load end of the shaft and resisting the rotational displacement of one drum relative to the other, said spring urging said stop into engagement with said companion means when the shaft is not transmitting torque, said engagement establishing the "zero" position of the drums, the relative rotational displacement between the drums increasing as the torque transmitted by the shaft increases, a scale, extended reference means having a longitudinal component carried by the inner drum, superimposed extended reference means having a longitudinal component carried by the outer drum, said reference means carried by the inner and outer drums extending at angles to each other so as to intersect during operation, the resilient coupling between the drums permitting the point of intersection of the said reference means to move relative to the scale as the two drums are relatively displaced from the "zero" position, said intersection appearing as an index adjacent the scale when the drums are rotating, a housing enclosing said telescoped drums, said housing having end walls, bearings accommodated in said end walls for the support of the drive end and load end of the shaft, said bearings preventing axial displacement of said drums, a hollow cylindrical housing connected at one end to one of said drums and extending through said inner drum for the accommodation of the spring, said spring urging said drums into engagement with the bearings accommodated in said end walls, and bearings between the outer periphery of said cylindrical housing and the inner periphery of the inner drum.

2. A torque measuring device adapted to be interposed between the drive end and the load end of a shaft comprising a drum connected to the drive end of the shaft, a drum connected to the load end of the shaft, said drums being arranged in telescoping relationship, a resilient coupling between the drive end and the load end of the shaft permitting, but resisting, rotational displacement of one drum relative to another, extended reference means having a longitudinal component carried by the inner drum, extended reference means having a longitudinal component carried by the outer drum, said respective reference means carried by the inner and outer drums extending at angles to each other so as to intersect during operation, said intersection generating a discernible reading which is displaceable axially in the event of a change in the torque transmitted from the drive end to the load end of the shaft, and companion bearing surfaces carried by said drums in telescoping relationship for preventing axial displacement of the drums relative to each other while permitting rotational displacement relative to each other.

3. A torque measuring device adapted to be interposed between the drive end and the load end of a shaft comprising a drum connected to the drive end of the shaft, a drum connected to the load end of the shaft, said drums being arranged in telescoping relationship, a spring forming a resilient coupling between the drive end and the load end of the shaft and resisting the rotational displacement of one drum relative to the other, the relative rotational displacement between the drums increasing as the torque transmitted by the shaft increases, extended reference means having a longitudinal component carried by the inner drum, superimposed extended reference means having a longitudinal component carried by the outer drum, said respective reference means carried by the inner and outer drums extending at angles to each other so as to intersect during operation, said intersection generating a discernible reading which is displaceable axially in the event of a change in the torque transmitted from the drive end to the load end of the shaft, a housing enclosing said telescoped drums, said housing having end walls, bearings accommodated in said end walls for the support of the drive end and load end of the shaft, said bearings preventing axial displacement of said drums, a hollow cylindrical housing connected at one end to one of said drums and extending through said inner drum for the accommodation of the spring, and bearings between the outer periphery of said cylindrical housing and the inner periphery of the inner drum.

References Cited in the file of this patent

UNITED STATES PATENTS

| | | |
|---|---|---|
| 1,996,760 | Good | Apr. 9, 1935 |
| 2,256,478 | Hill | Sept. 23, 1941 |
| 2,580,395 | Bellizzi | Jan. 1, 1952 |

FOREIGN PATENTS

| | | |
|---|---|---|
| 195,829 | Great Britain | Apr. 12, 1923 |
| 886,821 | Germany | Aug. 17, 1953 |